United States Patent Office 2,808,393
Patented Oct. 1, 1957

2,808,393
TERPOLYMER OF VINYL ACETATE, MALEIC ANHYDRIDE AND A BETA ALKOXY ETHYL PARTIAL ESTER OF MALEIC ACID

Alva F. Harris, Wilbraham, Mass., assignor to Monsanto Chemical Company, St. Louis, Mo., a corporation of Delaware No Drawing. Application December 15, 1954,
Serial No. 475,586

4 Claims. (Cl. 260—78.5)

This invention relates to new terpolymers. More particularly the invention relates to terpolymers of vinyl acetate, maleic anhydride and alkoxy ethyl partial esters of maleic acid.

Copolymers of vinyl acetate and maleic anhydride have many commercial uses but are restricted in their use by the heterogeneity of the copolymer and the difficulty of control of the copolymerization reaction. One drawback to their extended use is that the copolymers are heterogeneous due to the separation of a gel phase during the polymerization process. As a result, it is difficult to obtain a uniform size on textiles and it is also difficult to duplicate results from batch to batch.

One object of this invention is to provide new terpolymers.

Another object is to provide a third component for copolymerization with vinyl acetate and maleic anhydride which will not form a gel in the polymerization process.

A further object is to provide terpolymers of vinyl acetate, maleic anhydride and alkoxy ethyl partial esters of maleic acid.

These and other objects are attained by the mass polymerization of vinyl acetate with maleic anhydride and alkoxy ethyl partial esters of maleic acid in the presence of a free radical producing catalyst.

The following example is given in illustration and is not intended as a limitation on the scope of this invention. Where parts are mentioned they are parts by weight.

Example I

Mix together 1 mol of maleic anhydride and about 0.3 mol of beta methoxy ethanol and heat the mixture at 90° C. for about half an hour to prepare a partial ester of the beta methoxy ethanol and maleic acid. Mix about 52 mol percent of vinyl acetate, about 34 mol percent of maleic anhydride and about 14 mol percent of the partial ester with 0.3 part of tertiary butyl perbenzoate. Heat the mixture at 50–70° C. to initiate polymerization and then reduce the temperature by about 10° C., i. e. to 40–60° C. Continue the polymerization with agitation at 40–60° C. until the mixture is too viscous to stir, about 15–20 hours. Then raise the temperature slowly over a period of 30–40 hours to 100–105° C. and maintain the mixture at the raised temperature for at least an hour. The product is a hard clear mass which is soluble in water. No gel formation is observed at any time during the polymerization process. The viscosity of the product in a 5% aqueous solution at 25° C. ranges from 20–30 centipoises.

Similar results are obtained when the beta methoxy ethanol is replaced in whole or in part by molecular equivalent amounts of beta ethoxy ethanol, beta propoxy ethanol, beta butoxy ethanol or mixtures thereof. Moreover the amount of alkoxy ethanol may be varied from 0.2–0.5 mol per mol of maleic anhydride to yield similar products varying slightly in physical properties. Within these limits the products are water-soluble and there is no apparent gel formation during the polymerization process.

The terpolymers of this invention are restricted to materials in which the ratio of vinyl acetate to total maleic anhydride and maleic partial ester on a mol percent basis is from 52–48 to 50–50 and ratio of maleic anhydride to maleic partial ester on a mol percent basis is from 40–10 to 30–20. The degree of esterification of the maleic acid in the partial ester may vary from 20–50% esterification.

The terpolymers are best prepared by a mass polymerization process using a free radical producing catalyst and, if desired, a polymerization modifier. The catalyst is preferably a peroxy compound such as a peroxide, a hydroperoxide, or a persalt but other materials such as the azo catalysts may be used. The amount of catalyst may vary from 0.1–0.5 part per 100 parts of total monomer. In many cases it is desirable to use a combination of peroxy catalyst which are active at different temperatures. The polymerization modifier may be beta nitro styrene, a mercaptan, etc. and is used in small amounts to produce a product having a low viscosity.

The mass polymerization is most efficiently carried out by mixing all of the components at room temperature, raising the temperature to 50–70° C. for a short time to initiate the reaction, then lowering the temperature to about 10° C. to about 40–60° C., continuing the polymerization at the lower temperature preferably accompanied by constant agitation until the reaction mass is too viscous to stir. This reaction period normally takes between 15 and 25 hours. Finally the temperature is gradually raised to 100–120° C. over an extended period of 30–40 hours and the mass maintained at the highest temperature for at least one hour to finish the reaction.

By operating within the foregoing limits as to ingredients and reaction conditions, products are obtained which are completely water-soluble and substantially homogeneous. There is no evidence of gel separation during the preparation of the terpolymers. The viscosity of the terpolymers in 5% aqueous solution ranges from 5–100 centipoises at 25° C. Aqueous solutions of the terpolymers are particularly useful as sizing agents for textile materials and especially for nylon yarns.

What is claimed is:

1. A terpolymer of vinyl acetate, maleic anhydride and a beta alkoxy ethyl partial ester of maleic acid wherein the ratio of vinyl acetate to combined maleic anhydride and maleic partial ester varies from 52–48 to 50–50 on a mol percent basis, the ratio of maleic anhydride to maleic partial ester varies from 40–10 to 30–20 on a mol percent basis and the degree of esterification of the maleic partial ester is from 20–50%.

2. A terpolymer as in claim 1 wherein the alkoxy group in the partial ester is a methoxy group.

3. A terpolymer of about 52 mol percent of vinyl acetate, about 34 mol percent of maleic anhydride and about 14 mol percent of a methoxy ethyl maleate in which the degree of esterification is about 30%.

4. A process for preparing terpolymers of vinyl acetate, maleic anhydride and beta alkoxy ethyl partial esters of maleic acid which comprises mixing the monomers with a free radical producing catalyst, heating the mixture to 50–70° C. to initiate polymerization, then heating the mixture at 40–60° C. for 15–25 hours and then gradually raising the temperature to 100–120° C. over a period of 30–40 hours, the monomer mixture employed being such that the mol percent ratio of vinyl acetate to combined maleic anhydride and maleic partial ester varies from 52–48 to 50–50, the mol percent ratio of maleic anhydride to maleic partial ester varies from 40–10 to 30–20, and the degree of esterification in the maleic ester is from 20 to 50%.

No references cited.